2,745,859
METHOD FOR THE PREPARATION OF ZINC ETHIONATE

Frederick H. Norton and Donna Stevens, Concord, Calif., assignors to The Dow Chemical Company, Midland, Mich., a corporation of Delaware No Drawing. Application July 7, 1954, Serial No. 441,944

3 Claims. (Cl. 260—429)

This invention relates to a method for the preparation and recovery of zinc ethionate $$(C_2H_5\text{—}S\text{—}CH_2CH_2\text{—}CH(NH_2)COO)_2Zn$$

in substantial purity from ethionine solutions containing interfering ammonium or carbonate ions, or both.

Zinc ethionate has been found to be a useful agricultural chemical. It can be prepared from substantially pure ethionine, but the necessity for purifying the ethionine makes such a process unduly costly. It would be desirable to be able to make a good grade of zinc ethionate from the crude solutions in which ethionine is prepared, without need for first isolating the ethionine. Ethionine is most commonly prepared, however, by hydrolysis of 5(2-ethylmercaptoethyl) hydantoin or of ethionine nitrile. Either reaction produces a solution of hydrolysate containing ammonium ions, and the hydantoin and nitrile solutions from some processes contain carbonate ions which remain in the hydrolysate. When ethionine solutions containing ammonium ions are treated with soluble zinc salts, incomplete precipitation of a relatively impure zinc ethionate is obtained from neutral or acid solutions. When ethionine solutions containing carbonate ions are similarly treated with soluble zinc salts, any zinc ethionate which may be formed is contaminated with coprecipitated zinc carbonate. Zinc ethionate cannot be precipitated from alkaline media, in useful purity, because soluble zinc salts are converted in mildly alkaline media to insoluble zinc hydroxide, while in strongly alkaline media the zinc salts are converted to zinc hydroxide which remains dissolved along with the soluble alkali salt of ethionine.

It is the principal object of this invention to provide a method for obtaining substantially pure zinc ethionate from crude ethionine solutions.

The desired result is obtained, according to the invention, by first heating a crude aqueous ethionine solution at an alkaline pH, preferably above 10, to a temperature at which ammonia is driven off, preferably near the boiling point of the solution. When the alkaline solution no longer releases ammonia at a significant rate, the solution is acidified, preferably to a pH below 6, and is heated to or near the boiling point to effect decarbonation. Thereafter, upon addition of a water-soluble zinc salt in amount preferably equivalent to the ethionine present, zinc ethionate precipitates in substantial purity when and if the pH of the solution is in the range from 6 to 7. The pH adjustment for the precipitation of zinc ethionate may occur either before or after introduction of the soluble zinc salt. If the amount of zinc salt added is less than that equivalent to the ethionine present, the recovery of the ethionate is uneconomical. If the amount of such added zinc salt is much greater than equivalent to the ethionine in the solution, the precipitated zinc ethionate is not pure.

The following example illustrates the practice of the invention:

An aqueous solution of crude ethionine, obtained directly from the alkaline hydrolysis of 5(2-ethylmercaptoethyl) hydantoin, when treated with zinc chloride did not form a zinc ethionate precipitate at any pH value. The solution was shown by analysis to contain about 118 grams (0.72 mol) of ethionine per liter. It also contained substantial quantities of ammonium and of carbonate ions. A sample of the crude ethionine solution at pH 12 was boiled until ammonia evolution was no longer detected. The remaining solution was acidified to about pH 3 with hydrochloric acid and boiled again. There was then added 0.5 mol of zinc chloride for each mol of ethionine, and the resulting clear solution was neutralized to pH 7 by the careful addition of sodium hydroxide, whereupon a white precipitate was formed. The mixture was brought to the boiling point and filtered while hot. The precipitate was washed with boiling water until the washings were free of chloride ions, and then dried. There was obtained an 85 per cent yield of zinc ethionate having the following analysis which shows it to be about 99 per cent pure:

| | Theoretical | Found |
|---|---|---|
| Percent zinc | 16.8 | 17.0 |
| Percent sulfur | 16.5 | 16.3 |

The same problem exists when it is attempted to recover zinc ethionate from the crude solution from the hydrolysis of ethionine nitrile made by the Strecker reaction. Pure zinc ethionate is obtained from such solution after alkaline deamination and acid decarbonation, by adding a soluble zinc salt and adjusting the pH to the range from 6 to 7.

We claim:

1. The method which comprises deaminating at pH above 7 an aqueous solution of crude ethionine originally containing ions which interfere with precipitation of zinc ethionate, decarbonating the resulting solution after acidification to pH below 7, and precipitating zinc ethionate by reaction of the so-treated solution with a water-soluble zinc salt at a pH from 6 to 7.

2. The method claimed in claim 1, wherein deamination is effected at pH of at least 10.

3. The method claimed in claim 1, wherein decarbonation is effected at pH below 6.

No references cited.